US012221937B2

(12) United States Patent
Goto et al.

(10) Patent No.: US 12,221,937 B2
(45) Date of Patent: Feb. 11, 2025

(54) ENGINE STRUCTURE

(71) Applicant: ISUZU MOTORS LIMITED, Yokohama (JP)

(72) Inventors: Misao Goto, Fujisawa (JP); Kazunari Yamamoto, Fujisawa (JP); Takumi Komiyama, Fujisawa (JP)

(73) Assignee: ISUZU MOTORS LIMITED, Kanagawa (JP)

( * ) Notice: Subject to any disclaimer, the term of this patent is extended or adjusted under 35 U.S.C. 154(b) by 0 days.

(21) Appl. No.: 18/593,531

(22) Filed: Mar. 1, 2024

(65) Prior Publication Data

US 2024/0301838 A1 Sep. 12, 2024

(30) Foreign Application Priority Data

Mar. 9, 2023 (JP) ................................ 2023-036278

(51) Int. Cl.
*F02F 1/00* (2006.01)

(52) U.S. Cl.
CPC ................................... *F02F 1/004* (2013.01)

(58) Field of Classification Search
CPC .... F02F 1/24; F02F 1/004; F02F 11/00; F02F 3/0084; F02F 2001/006; F16J 10/04; F16J 1/01
See application file for complete search history.

(56) References Cited

U.S. PATENT DOCUMENTS

| | | | | |
|---|---|---|---|---|
| 5,469,777 | A * | 11/1995 | Rao | F16J 10/04 29/888.074 |
| 7,438,037 | B2 * | 10/2008 | Oogake | F02F 1/004 123/193.2 |
| 9,562,491 | B2 * | 2/2017 | Beasley | F02B 23/0603 |
| 11,840,981 | B2 * | 12/2023 | Terakado | F02F 1/004 |
| 2015/0114373 | A1 | 4/2015 | Beasley | |
| 2015/0219042 | A1 | 8/2015 | Inwood et al. | |
| 2022/0065188 | A1 * | 3/2022 | Blankenhorn | F02B 77/04 |

FOREIGN PATENT DOCUMENTS

| | | | | |
|---|---|---|---|---|
| CN | 205744169 | U | 11/2016 | |
| DE | 102018205673 | A1 * | 10/2018 | F02B 77/02 |
| DE | 112012001145 | B4 * | 6/2020 | F02F 1/004 |
| EP | 3670882 | A1 * | 6/2020 | F02F 1/004 |
| JP | H08-042393 | A | 2/1996 | |
| JP | 2010203355 | A * | 9/2010 | |
| JP | 2014088863 | A * | 5/2014 | |
| JP | 2017089411 | A * | 5/2017 | |

* cited by examiner

*Primary Examiner* — Grant Moubry
(74) *Attorney, Agent, or Firm* — PROCOPIO, CORY, HARGREAVES & SAVITCH LLP

(57) ABSTRACT

This engine structure includes: a cylinder block in which a cylinder bore is formed; a piston provided in the cylinder bore; a cylinder head provided to an upper portion of the cylinder block in a manner to seal the cylinder bore; and a ring that is inserted in the upper end portion of the cylinder bore and has an inner diameter that is smaller than the diameter of the cylinder. A first abradable layer that is worn down by contact with an outer peripheral surface of the piston is formed on an inner peripheral surface of the ring.

6 Claims, 4 Drawing Sheets

ENGINE STRUCTURE

CROSS-REFERENCE TO RELATED APPLICATIONS

The present application claims priority to Japanese Patent Application number 2023-36278, filed on Mar. 9, 2023 contents of which are incorporated herein by reference in their entirety.

BACKGROUND OF THE INVENTION

The present disclosure relates to an engine structure. A concave portion called a cavity is formed on the top surface of a diesel engine piston, contributing to a part of the combustion chamber where fuel is injected (for example, see Japanese Unexamined Patent Application Publication No. 2017-89411).

To enhance the diesel engine's thermal efficiency, reducing the unnecessary volume communicating with the combustion chamber is preferable, and the configuration of Japanese Unexamined Patent Application Publication No. 2017-89411 has room for improvement in this regard.

BRIEF SUMMARY OF THE INVENTION

The present disclosure has been made in view of these points, and its object is to provide an engine structure that improves the thermal efficiency of a diesel engine.

An engine structure according to the present disclosure includes: a cylinder block in which a cylinder bore is formed; a piston provided in the cylinder bore; a cylinder head provided to an upper portion of the cylinder block in a manner to seal the cylinder bore; a ring that is inserted in an upper end portion of the cylinder bore and has an inner diameter that is smaller than a diameter of the cylinder bore, wherein a first abradable layer that is worn down by contact with an outer peripheral surface of the piston is formed on an inner peripheral surface of the ring.

An engine structure according to another implementation of the present disclosure includes: a cylinder block in which a cylinder bore is formed; a piston provided in the cylinder bore; and a cylinder head provided to an upper portion of the cylinder block in a manner to seal the cylinder bore, wherein a portion of the cylinder bore on an upper end side has a smaller diameter than a portion of the cylinder bore on a lower end side, and the cylinder bore has an abradable layer having hardness that is lower than hardness of the piston, on an inner peripheral surface of the portion of the cylinder bore on the upper end side.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Figure 1:
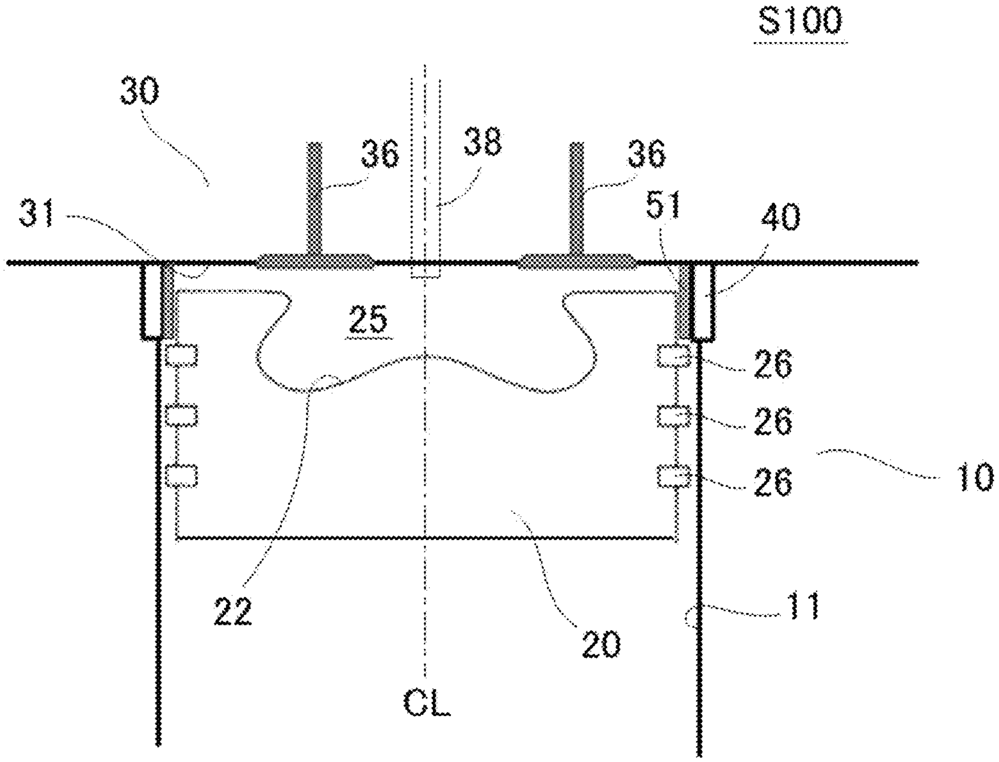
FIG. 1 is a cross-sectional view showing an engine structure according to one embodiment of the present disclosure.

Embodiments of the present disclosure will now be described with reference to the attached drawings. FIG. 1 is a cross-sectional view showing an engine structure according to one embodiment of the present disclosure.

An engine structure S100 forms a part of a diesel engine, for example. Although the diesel engine has a plurality of cylinders as an example, only one cylinder and its peripheral structure are shown in FIG. 1.

The engine structure S100 includes a cylinder block 10, a piston 20, a cylinder head 30, and a ring 40 as main components.

In the present specification, a "radial direction" refers to the radial direction of the piston 20 or a cylinder bore 11 in relation to a cylinder axis CL. With regard to phrases indicating directions, "up" refers to the top dead center side of the piston 20 and "down" refers to the bottom dead center side of the piston 20.

The cylinder block 10 is a metal member. The cylinder bore 11 having a cylindrical shape is formed in the cylinder block 10. In FIG. 1, the central axis of the cylinder bore 11 is depicted as a cylinder axis CL. The cylinder bore 11 is a cylindrical space where the piston 20 is housed and the piston 20 can reciprocate up and down.

The piston 20 is a columnar member. The piston 20 is configured to reciprocate inside the cylinder bore 11 along the cylinder axis CL. The piston 20 is connected to a crankshaft in a manner to be able to transmit power thereto. A concave portion 22 forming a part of a combustion chamber 25 is provided to an upper portion of the piston 20. The concave portion 22 is also called a cavity.

A plurality of ring-shaped members 26 are provided on an outer peripheral surface of the piston 20. In this example, three ring-shaped members 26 are provided at predetermined intervals from each other in the direction along the cylinder axis CL. It should be noted that each component in FIG. 1 is just schematically depicted. In FIG. 1, each ring-shaped member 26 is separated from an inner peripheral surface of the cylinder bore 11, but each ring-shaped member 26 actually comes into contact with the inner peripheral surface of the cylinder bore 11.

The cylinder head 30 is provided to an upper portion of the cylinder block 10. The cylinder head 30 is arranged in a manner to seal the cylinder bore 11. A lower surface 31 of the cylinder head 30 is planar and seals an opening of the cylinder bore 11, for example.

The cylinder head 30 is provided with a fuel injection member 38 for injecting fuel, and a plurality of valves 36. Specifically, the fuel injection member 38 and the plurality of valves 36 are provided in a circular region within the lower surface 31 of the cylinder head 30 that covers the cylinder bore 11. The fuel injection member 38 injects fuel toward the combustion chamber 25. The plurality of valves 36 are provided so as to reciprocate in order to take air into the combustion chamber 25 and to expel gas after combustion.

The ring 40 is inserted in an upper end portion of the cylinder bore 11. In the reciprocation of the piston 20, the upper end portion of the cylinder bore 11 corresponds to the top dead center side. Further, the upper end portion of the cylinder bore 11 is also referred to as an inlet portion of the cylinder bore 11 since the upper end portion of the cylinder bore 11 is provided with the fuel injection member 38 and the valve 36, where fuel and air enter. The ring 40 is an annular member having a peripheral wall with a constant thickness. The ring 40 is disposed in a fixed manner in a counterbore formed on the upper end portion of the cylinder bore 11. The counterbore is a stepped portion formed such that the inner diameter of the counterbore is larger than the inner diameter of the cylinder bore 11. The ring 40 has an inner diameter that is smaller than the diameter of the cylinder bore 11, and has an outer diameter that is larger than the diameter of the cylinder bore 11. This configuration allows the ring 40 to protrude radially inward beyond the inner peripheral surface of the cylinder bore 11. As shown in FIG. 1, an upper end portion of the piston 20 moves inside the ring 40 in a state where the piston 20 is positioned near the top dead center.

Having such a ring 40 provided reduces a volume around the uppermost ring-shaped member 26. As a result, the compression ratio in the combustion chamber 25 is improved, thereby improving the thermal efficiency.

The ring 40 protruding inwardly in the radial direction of the cylinder bore 11 is provided in this manner, offering an advantage that the thermal efficiency is improved. However, if the inner diameter of the ring 40 is too small, the ring 40 may interfere with the outer peripheral surface of the piston 20. Meanwhile, the gap between the piston 20 and the ring 40 is preferably as narrow as possible in consideration of the thermal efficiency.

In the present embodiment, an abradable layer 51 is formed on an inner peripheral surface of the ring 40. To distinguish this layer from abradable layers formed on other components, this layer is hereinafter referred to as a first abradable layer 51. The first abradable layer 51 is a coating provided on the inner peripheral surface of the ring 40 by abradable thermal spray. The first abradable layer 51 may be provided on the entire inner peripheral surface of the ring 40, or may be provided on a portion of the inner peripheral surface of the ring 40. The first abradable layer 51 may be provided on a portion of a region within the inner peripheral surface of the ring 40 facing the outer peripheral surface of the piston 20 (a region facing the outer peripheral surface of the piston 20 when the piston 20 is positioned at the uppermost point), for example.

The first abradable layer 51 is formed of a material mainly containing a metal component including cobalt, nickel, chromium, aluminum, yttrium, or the like. This material may contain boron nitride serving as a solid lubricant and polyester for porosity control. This material is thermally sprayed by atmospheric plasma spraying (APS) or the like, for example. The thermally sprayed material is then heat-treated. This heat treatment eliminates polyester. Due to this, the first abradable layer 51*d* is formed.

The first abradable layer 51 is configured to have lower hardness than other members constituting the engine. The hardness of the first abradable layer 51 is lower than at least the hardness of the piston 20. Therefore, when the first abradable layer 51 contacts the piston 20, the first abradable layer 51 is worn down without damaging the piston 20, for example. In an initial state (a state before being worn down), the first abradable layer 51 is formed to have a thickness such that the inner diameter of the ring 40 on which the first abradable layer 51 has been formed is smaller than the diameter of the piston 20. That is, the first abradable layer 51 is formed such that it contacts the outer peripheral surface of the piston 20. The first abradable layer 51 is worn down by contact with the outer peripheral surface of the piston 20.

According to the engine structure S100 in which the first abradable layer 51 is formed, the piston 20 reciprocates in a state where each component has been assembled, so that the outer peripheral surface of the piston 20 comes into contact with the first abradable layer 51, and the first abradable layer 51 is worn down. As a result, it is possible to reduce the gap between the outer peripheral surface of the piston 20 and the inner peripheral surface of the ring 40 (including the first abradable layer 51).

(Effect of the Engine Structure S100)

In the engine structure S100 configured as described above, the first abradable layer 51 is formed on the inner peripheral surface of the ring 40. The first abradable layer 51 is worn down, making it possible to reduce the gap between the outer peripheral surface of the piston 20 and the inner peripheral surface of the ring 40 (including the first abradable layer 51). Therefore, the unnecessary volume communicating with the combustion chamber 25 is reduced, thereby improving the compression ratio in the combustion chamber 25 and improving the thermal efficiency.

According to the configuration in which the first abradable layer 51 is formed on the inner peripheral surface of the ring 40, the engine structure S100 can be manufactured by steps of forming the first abradable layer 51 on the inner peripheral surface of the ring 40 in advance and attaching, to the cylinder bore 11, the ring 40 on which the first abradable layer 51 has been formed, for example. In such steps, performing abradable thermal spray on the inner surface of the cylinder bore 11 attached with the ring 40 is not necessary, allowing for better work efficiency.

<Variations>

Figure 2:
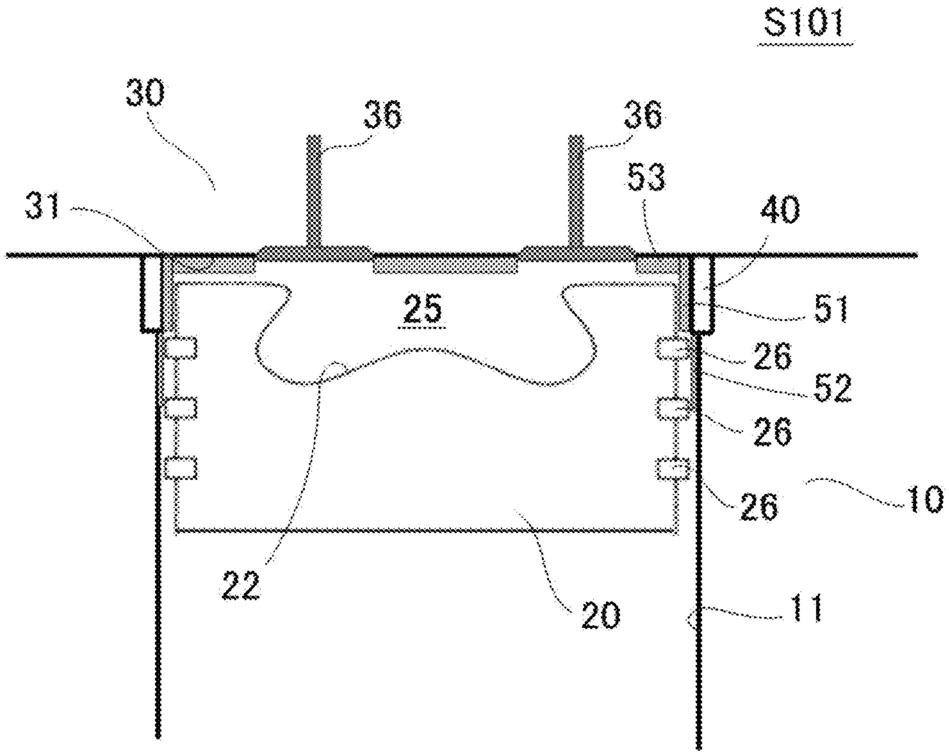
FIG. 2 is a diagram showing another embodiment.

The present disclosure is not limited to the above configuration. FIG. 2 is a diagram showing another embodiment. As shown in FIG. 2, in an engine structure S101, abradable layers are formed not only on the inner peripheral surface of the ring 40, but also on one or both of the cylinder block 10 and the cylinder head 30. In this example, the layer is formed on both of the cylinder block 10 and the cylinder head 30.

Specifically, in the engine structure S101 of FIG. 2, a second abradable layer 52 is formed on a region immediately below the ring 40 within the inner peripheral surface of the cylinder bore 11. Specifically, in a state where the piston 20 is positioned at the top dead center, the second abradable layer 52 is formed on a region including at least a region that is below a lower end of the ring 40 and above a lower end of the uppermost ring-shaped member 26 among the plurality of ring-shaped members 26, as “a region immediately below”. The second abradable layer 52 may be formed on a region including at least a region above a lower end of the lowermost ring-shaped member 26 among the plurality of ring-shaped members 26.

Further, a third abradable layer 53 is also formed in the engine structure S101 of FIG. 2 The third abradable layer 53 is formed on at least a part of a circular region of the cylinder head 30 that covers the cylinder bore 11. In a state before being worn down, the third abradable layer 53 may be formed to have such a thickness that the third abradable layer 53 contacts a top surface 21 of the piston 20 positioned at the top dead center. The third abradable layer 53 is worn down due to the operation of the piston 20. As a result, it is possible to reduce the gap between the periphery of the top surface 21 and the third abradable layer 53.

According to such a configuration, the unnecessary volume communicating with the combustion chamber 25 can be reduced, thereby improving the compression ratio in the combustion chamber 25 and improving the thermal efficiency.

Figure 3:
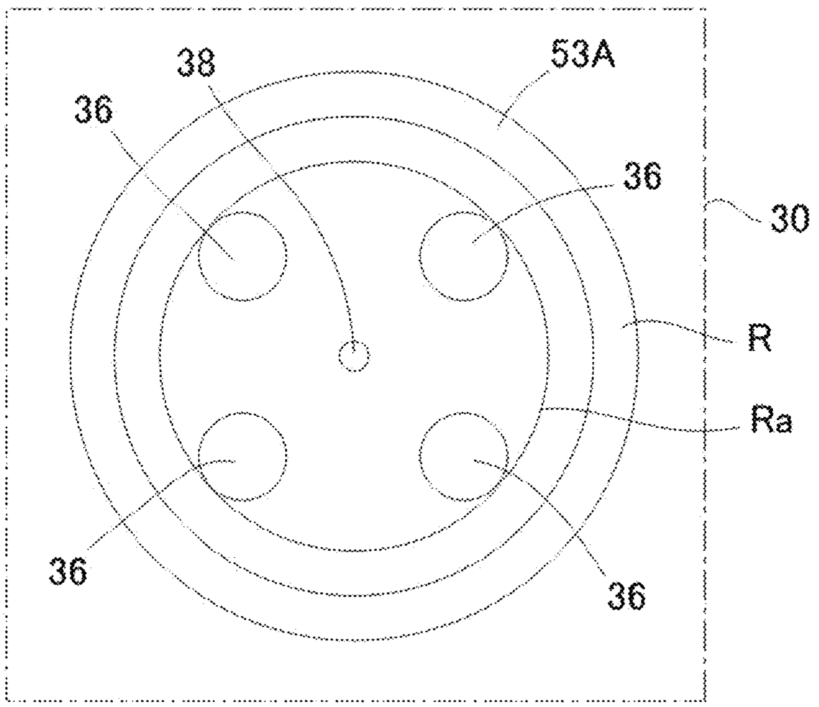
FIG. 3 is a schematic diagram showing another variation.

FIG. 3 is a schematic diagram showing another variation. In FIG. 2, the third abradable layer 53 is formed entirely on the circular region of the cylinder head 30 that covers the cylinder bore 11, but the present disclosure is not limited to this.

As shown in FIG. 3, a third abradable layer 53A may be formed on a ring-shaped region R that is outward from the fuel injection member 38 and the plurality of valves 36.

The inner diameter of the ring-shaped region R is larger than the diameter of a circular region Ra where the plurality of valves 36 are present (the minimum circular region including the plurality of valves 36), for example. When the third abradable layer 53A is provided on such a ring-shaped region R, the third abradable layer 53A does not contact the valve 36. Therefore, it is possible to prevent a coating of an abradable material on the surface of the cylinder head 30 from contacting the valve 36 and being peeled off.

In the above embodiment, the ring 40 is inserted in order to reduce the inner diameter of the upper end portion of the cylinder bore 11, but the present disclosure is not limited to this configuration. That is, the present disclosure is not limited to the above configuration if it is possible to make the inner diameter of a portion of the cylinder bore 11 on an upper end side smaller than the inner diameter of a portion of the cylinder bore 11 on a lower end side. The engine structure may be configured such that the upper end portion of the cylinder bore 11 has a smaller inner diameter, or the inner diameter of the lower end portion of the cylinder bore 11 may be increased by after-processing during casting, for example.

Figure 4:
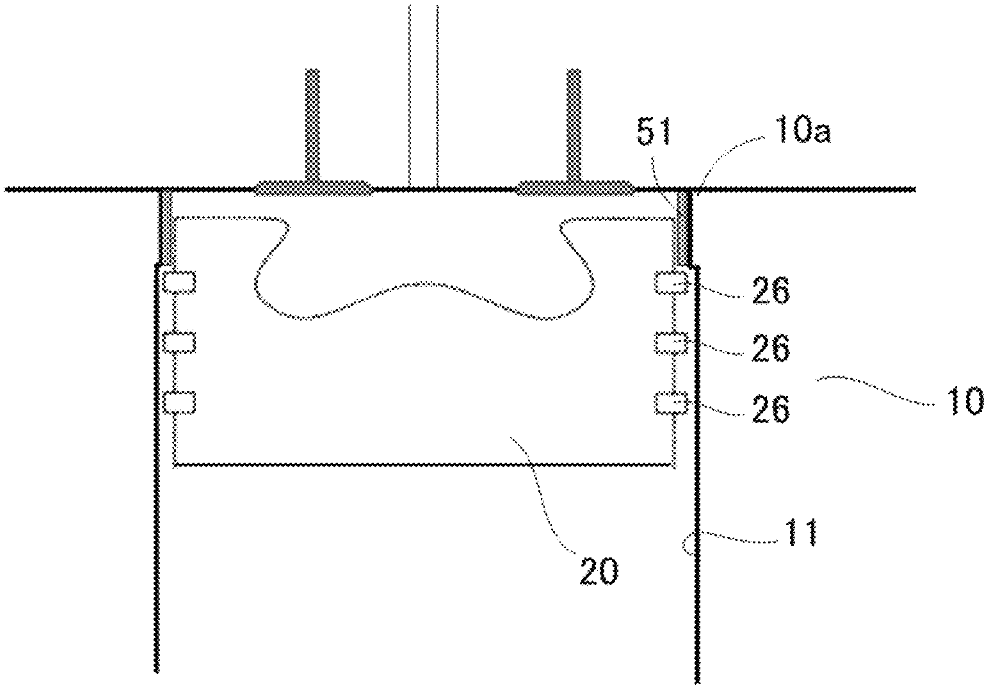
FIG. 4 is a diagram showing yet another variation.

FIG. 4 is a diagram showing yet another variation. The engine structure according to the present disclosure, in another embodiment, may be configured such that the inner diameter of the portion of the cylinder bore 11 on the upper end side is smaller than the inner diameter of the portion of the cylinder bore 11 on the lower end side (that is, the diameter of the upper end portion is smaller than that of the portion of the lower end side), and to include the abradable layer 51 having hardness that is lower than that of the piston 20 on an inner peripheral surface of the portion of the cylinder bore 11 on the upper end side.

That is, the abradable layer 51 may be formed not on the inner peripheral surface of the ring 40, but on a portion 10*a* of the cylinder bore on the upper end side, as illustrated in FIG. 4. This portion 10*a* is a small-diameter portion formed to have a diameter that is smaller than diameters of the other portions of the cylinder bore. The portion 10*a* is an example of an alternative structure of the ring 40.

It should be noted that the portion of the cylinder bore 11 on the lower end side is a portion that opposes the cylinder head 30 when the piston 20 reciprocates in the cylinder bore 11.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments. Effects of the new exemplary embodiments brought by the combinations also have the effects of the original exemplary embodiments.

What is claimed is:

1. An engine structure comprising:
a cylinder block in which a cylinder bore is formed;
a piston provided in the cylinder bore;
a cylinder head provided to an upper portion of the cylinder block in a manner to seal the cylinder bore; and
a ring that is inserted in an upper end portion of the cylinder bore and has an inner diameter that is smaller than a diameter of the cylinder bore, wherein
a first abradable layer that is worn down by contact with an outer peripheral surface of the piston is formed on an inner peripheral surface of the ring, wherein
an upper abradable layer is formed on at least a part of a circular region of the cylinder head that covers the cylinder bore.

2. The engine structure according to claim 1, wherein
the circular region is provided with:
a fuel injection member for injecting fuel, and
a plurality of valves, wherein
the upper abradable layer is formed on a ring-shaped region that is outward from the fuel injection member and the plurality of valves.

3. The engine structure according to claim 1, wherein
hardness of the first abradable layer is lower than hardness of the piston.

4. The engine structure according to claim 1, wherein a second abradable layer is formed on a region immediately below the ring within an inner peripheral surface of the cylinder bore.

5. The engine structure according to claim 4, wherein the region immediately below includes a region from a lower end of the ring to a lower end of a ring-shaped member provided on the outer peripheral surface of the piston in a state of being positioned at a top dead center.

6. An engine structure comprising:
a cylinder block in which a cylinder bore is formed;
a piston provided in the cylinder bore; and
a cylinder head provided to an upper portion of the cylinder block in a manner to seal the cylinder bore, wherein
a portion of the cylinder bore on an upper end side has a smaller diameter than a portion of the cylinder bore on a lower end side,
the cylinder bore has an abradable layer having hardness that is lower than hardness of the piston, on an inner peripheral surface of the portion of the cylinder bore on the upper end side, and
an upper abradable layer is formed on at least a part of a circular region of the cylinder head that covers the cylinder bore.

* * * * *